AUTOMATIC SELF-BALANCING REMOTE MEASURING SYSTEM OF AN IMPEDANCE RESPONSIVE PROCESS VARIABLE

Original Filed Feb. 12, 1964

INVENTORS
Kenichi Isoda
Naoya Ono

Meston & Meston 3,418,571
AUTOMATIC SELF-BALANCING REMOTE MEASURING SYSTEM OF AN IMPEDANCE RESPONSIVE PROCESS VARIABLE Kenichi Isoda, Kitatama-gun, Tokyo-to, and Naoya Ono, Kodaira-shi, Japan, assignors to Kabushiki Kaisha Hitachi Seisakusho, Tokyo-to, Japan, a joint-stock company Continuation of application Ser. No. 344,459, Feb. 12, 1964. This application May 11, 1967, Ser. No. 637,856
Claims priority, application Japan, Feb. 13, 1963, 38/5,938
3 Claims. (Cl. 324—61)

ABSTRACT OF THE DISCLOSURE

A self-balancing remote measuring system of a process variable wherein a capacitor as a tuning element of a frequency discriminating circuit is mechanically coupled with a self-balancing means driven by an output signal of the frequency discriminating circuit so that the capacitance of the capacitor is caused to vary linearly in the direction such as to cause the output signal to decrease in response to the output signal.

This application is a continuation of application Ser. No. 344,459, filed Feb. 12, 1964, now abandoned.

This invention relates to devices for process control and, more particularly, to a new automatic self-balancing remote measuring system of a process variable.

In the field of process control, there are frequency occasions when process variables are converted into C (capacitances) or L (inductances) which are in linear relationship with those process variables. For example, when a bar electrode $C_1$ coated uniformly with insulating material is caused to be disposed uprightly in a conductive liquid $C_2$, the electrostatic capacity C between the bar electrode $C_1$ and the conductive liquid $C_2$ varies linearly with the level X (process variable) of the said conductive liquid relative to the electrode. This linear relationship may be utilized to convert the process variable, that is, the level of the conductive liquid, into the electrostatic capacity C, which is in a linear relationship with the said level.

In many cases, however, the value of L or C converted in this manner must first be transmitted to a remote point for ordinary process control and must, at the same time, be converted into D-C voltage or current which is in a linear relationship with L or C (that is, in linear relationship with a process variable). For this purpose, the method which first occurs to ones mind is that of immediately converting L or C into a D-C voltage or current by means of an impedance bridge and transmitting the D-C voltage or current to the remote point. However, in view of various considerations, a more advantageous method is that which comprises converting the L or C once into frequency of an electrical oscillator OSC (for example, by inserting the L or C in the tank circuit T of an LC oscillator), transmitting the resulting frequency $f$ to a discriminating circuit disposed in a certain remote point and obtaining D-C voltage or current in linear relationship with the L or C from the frequency so transmitted. For example, in comparison with the former method, this latter method has certain advantages such as the possibility of using a two-wire system commonly for both power supply lines and signal transmission over substantially long transmission distances.

One problem, however, is that of whether or not the D-C voltage or current in linear relationship with the L or C can be obtained in a simple manner from the above-mentioned frequency. It is possible, of course, to obtain D-C voltage or current in linear relationship with the frequency in a simple manner by means of a conventional frequency discriminator circuit. However, between the frequency and L or C, there is a relationship which is expressible by the following equation.

$$f=\frac{1}{2\pi\sqrt{LC}} \qquad (1)$$

Therefore, D-C voltage or current in linear relationship with L or C cannot be obtained in such a frequency discriminator circuit.

More explicitly, in the case of a conventional frequency discriminator, the following relationship (linear relationship) exists between the output voltage E and frequency $f$ thereof.

$$E=K_1f+E_o \qquad (2)$$

Therefore, the following relationship is valid between E and L, C.

$$E=\frac{K_1}{2\pi\sqrt{LC}}+E_o \qquad (3)$$

From the above Equation 3, it is apparent that there is no linear relationship between E and L, C.

It is an object of the present invention to provide in such a conventional frequency discriminator a simple compensator circuit and thereby to provide a linear relationship between the output voltage or current of said discriminator and process variable.

It is another object to provide a frequency discriminator as above stated which is effectively and conveniently applicable to a wide range of uses.

The nature, principle, and details of the invention will be more clearly apparent by reference to the following description, taken in conjunction with the accompanying drawings in which.

Figure 1:
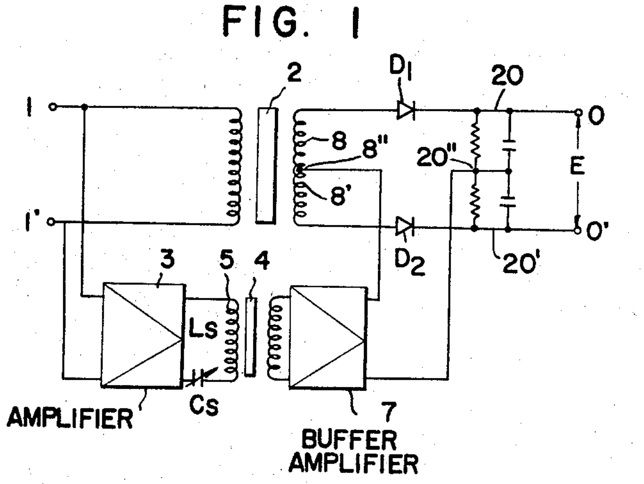
FIGURE 1 is a circuit diagram of a frequency discriminating circuit of known type.

Referring first to FIGURE 1, there is shown a frequency discriminator circuit of known type wherein a linear relationship exists, within a certain frequency range, between the frequency of the input signal and the output voltage. An input voltage of frequency $f$ which is applied to input terminals 1 and 1' is applied simultaneously to the primary winding of a resonator transformer 2 and to an amplifier 3. The output of the amplifier 3 is applied to a series-connected resonance circuit consisting of the primary winding (inductance $L_s$) of a resonance transformer 4 and a variable air capacitor $C_s$. The amplifier 3 is so designed that its output impedance is low, and, at the same time its phase rotation is almost non-existent.

When the frequency of the input signal coincides with the resonance frequency $f_o$ of this series-connected resonance circuit, the phase difference between two voltages applied to this frequency discriminating circuit, that is, the voltage produced in the secondary winding 8, 8' of the resonance transformer 2 and the output voltage of a buffer amplifier 7, becomes exactly 90 degrees. The above-mentioned resonance frequency $f_0$ is expressed by the following equation.

$$f_0=\frac{1}{2\pi\sqrt{L_s\cdot C_s}} \quad (4)$$

The buffer amplifier is so designed that its input impedance is high, its output impedance is low, and its phase rotation is almost non-existent. Furthermore, the output of the buffer amplifier is connected between the center tap 8'' of the transformer 2 and a connecting point 20'' of two output circuits 20 and 20'. In addition, two rectifier elements $D_1$ and $D_2$ are respectively connected between secondary winding of the transformer 2 and the respective output circuits 20 and 20'.

In the operation of a circuit of the above-described composition and arrangement, when the input signal frequency becomes equal to the resonance frequency $f_0$, no D-C output voltage is produced between the output terminals 0 and 0' of the frequency discriminating circuit. At input frequencies below or above the resonance frequency $f_0$, the phase difference of the aforementioned two voltages shifts below and above 90 degrees as a median value. Accordingly, the D-C output voltage E between the output terminals 0 and 0' exhibits the well-known characteristic indicated in FIGURE 2.

Figure 2:
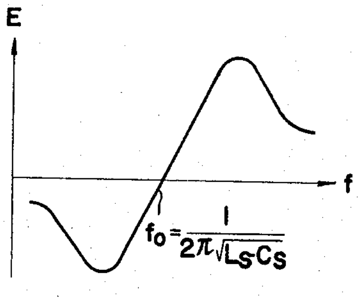
FIGURE 2 is a graphical representation indicating an operational characteristic of the circuit shown in FIGURE 1.

The characteristic curve shown in FIGURE 2 is substantially linear in its region in the vicinity of $f_0$. Then, by introducing the condition of $E=O$ at $f=f_0$ into Equation 2, the following relationship between E and $f$ is obtained.

$$E=K_1(f-f_0) \quad (5)$$

This means, of course, that there is no linear relationship between E and L, C. In order to establish a linear relationship, it is necessary to produce a relationship as expressed by the following equation.

$$E=\frac{\dot{K}'_1}{f^2}+\dot{E}'_0 \quad (6)$$

The reason for this is that, by substituting Equation 1 into Equation 6, the following equation is obtained.

$$E=(2\pi)^2\dot{K}'_1 \quad LC+E'_0 \quad (7)$$

According to this Equation 7, a linear relationship is obtained between E and L, C.

Figure 3:
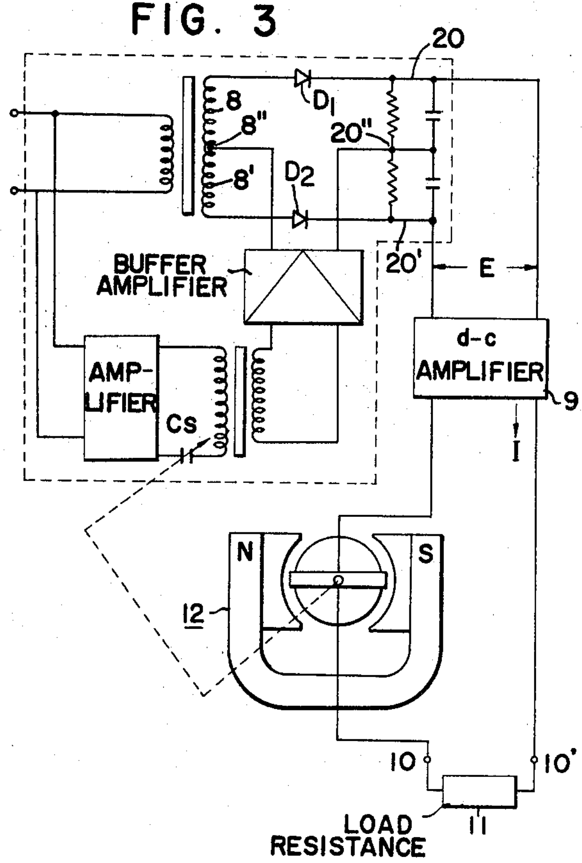
FIGURE 3 is a circuit diagram of a preferred embodiment of the automatic self-balancing remote measuring system of a process variable according to the invention.

In one preferred embodiment as shown in FIGURE 3 of the circuit according to the invention, which exhibits the above described characteristics, the upper lefthand part thereof as shown is the same as a conventional circuit as shown in FIGURE 1, and the lower righthand part, which is connected to the output of the said conventional circuit, is a circuit essentially comprising a D-C amplifier 9, a moving coil type torque motor 12, and a load resistance 11, the moving coil of the torque motor 12 and the load resistance 11 being series connected across the output of the amplifier 9. The D-C amplifier 9 is designed to have a high output impedance.

Figure 4:
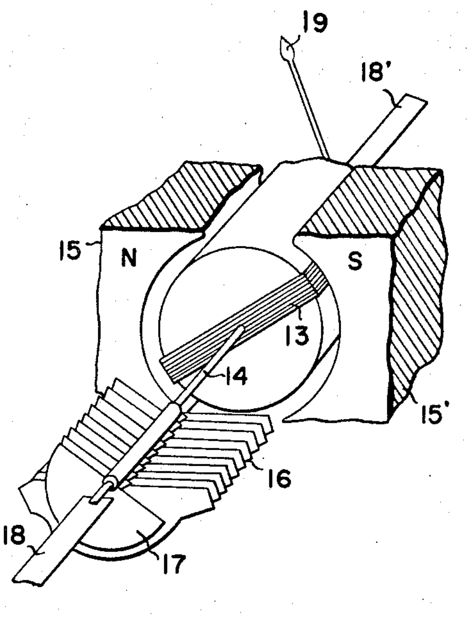
FIGURE 4 is a partial perspective view showing the construction of a moving coil type torque motor suitable for use in conjunction with the circuit shown in FIGURE 3.
Figure 5:
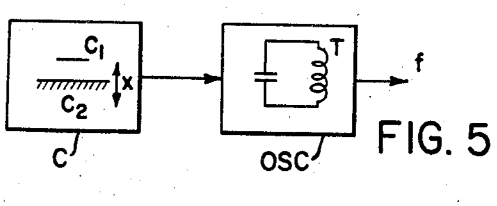
FIGURE 5 is a block diagram showing a conventional system for detecting a process variable (the level of the liquid).

As shown most clearly in FIGURE 4, the moving coil type torque motor 12, in general construction, is of the ordinary type, essentially comprising a moving coil 13 mounted on a shaft 14 and disposed centrally between a pair of pole pieces 15 and 15' of a permanent magnet. The shaft 14 of this torque motor 12 is directly coupled to the shaft of the variable air capacitor $C_s$ in the series resonance circuit of the aforementioned frequency discriminating circuit, the said variable air capacitor $C_s$ essentially comprising the said shaft, a rotor electrode 17 mounted on the said shaft, and a stator electrode 16. The said capacitor shaft and the torque motor shaft 14 are supported by suspension by spring strips 18 and 18', which moreover, impart to the said shafts a counter torque which is proportional to the angle of rotation of the shafts.

An indicator 19 is fixed to the motor shaft 14 to indicate the angle of rotation.

In the operation of the apparatus of the above described composition and arrangement, a D-C output voltage produced by the ordinary frequency discriminating circuit is applied to the D-C amplifier 9, and the resulting output current I of this D-C amplifier 9 is applied to the load resistance 11 connected through terminals 10 and 10' and to the moving coil 13 of the torque motor 12. Consequently the moving coil 13 rotates, causing the directly-coupled shaft of the capacitor $C_s$ also to rotate. The above described combination of the torque motor and variable capacitor is designed so that the angle of rotation $\theta$ will be proportional to the aforesaid current I, that is, so that the following relationship will exist.

$$\theta=K_2I \quad (8)$$

Furthermore, the variable air capacitor is so constructed that its capacitance $C_s$ will be proportional to the angle of rotation $\theta$ of its shaft, and the following relationship $$C_s=K_3\theta+C_0 \quad (9)$$

will exist.

Then, if the circuit connections are so arranged that the variable capacitor is caused by the output current of the D-C amplifier 9 to rotate in the direction such as to cause the output voltage of the frequency discriminating circuit to decrease, the rotor shaft, together with the rotor electrode, of the variable capacitor will balance at a certain angle and stop. Then, between the output current I of the D-C amplifier 9, under this balanced condition, and L, C, there will be the following linear relationships.

First, if it is assumed that, between the input voltage E of the D-C amplifier 9 and the output current I, the relationship $$I=GE \quad (10)$$

exists, the following equation can be obtained from Equations 4, 5, 8, 9, and 10.

$$f=\frac{1}{2\pi\sqrt{L_s\cdot C_s}}=\frac{C_s-C_0}{K_1\cdot K_2\cdot K_3\cdot G} \quad (11)$$

If G is selected to be substantially large and the loop transfer gain $K_1\cdot K_2\cdot K_3\cdot G$ to be sufficiently large, the right-hand side of Equation 11 will become infinitesimally small, and the following equation can be obtained.

$$f\doteqdot\frac{1}{2\pi\sqrt{L_s\cdot C_s}} \quad (12)$$

Further, from Equations 1 and 2, the following equation is obtained.

$$C_s\doteqdot\frac{L}{L_s}\cdot C \quad (13)$$

From Equations 8 and 9, the following equation is obtained.

$$C_s=K_2K_3I+C_0 \quad (14)$$

from which $$I=\frac{C_s-C_0}{K_2K_3} \quad (15)$$

From Equations 15 and 13, the following equation is obtained.

$$I=\frac{L\cdot C}{K_2\cdot K_3\cdot L_s}-\frac{C_0}{K_2\cdot K_3} \quad (16)$$

That is, between I and L, C, the desired linear relationship is established.

Furthermore, from Equations 8 and 16, the following relationship is valid.

$$\theta=\frac{L\cdot C}{K_3\cdot L_s}-\frac{C_0}{K_3} \quad (17)$$

This Equation 17 indicates that a linear relationship exists between the angle of rotation $\theta$ of the moving coil type torque motor and L·C (that is, the process variable). Accordingly, by providing an arcuate scale with equally spaced calibrations inscribed thereon for the indicator 19 shown in FIGURE 3, it is possible to read the value of $L \cdot C$.

As a modification, a D-C servomotor may be used in place of the moving coil torque motor 12. Furthermore, in place of the D-C amplifier, a D.C.–A.C. conversion type servo-amplifier may be provided, and its output applied to an A-C servomotor.

While in the above disclosure, the case wherein balancing is effected by varying the capacitance $C_s$ is described, it is possible to obtain a similar operation by varying the inductance $L_s$.

It is to be observed from the foregoing disclosure that, by the practice of the present invention, it is possible, by means of a relatively simple circuit composition and arrangement and from $f$ of Equation 1, to obtain a D-C voltage or current which has a linear relationship to L or C, that is, a linear relationship to $l/f^2$.

Accordingly, the present invention is effectively applicable not only to process control systems in which process variables are converted into inductances or capacitances which are in linear relationship with the said variables but also to a wide range of uses for measurements, particularly remote measurements, of inductances or capacitances.

More specifically by inserting an inductance or capacitance to be measured in the tank circuit of an LC oscillator, and applying the oscillation frequency voltage thereof (the frequency being indicated by Equation 1) to the frequency discriminator according to this invention, a D-C voltage or current in linear relationship with the inductance or capacitance can be obtained at the output terminals of the frequency discriminator. Accordingly, by causing the voltage or current so obtained to actuate a meter, the inductance or capacitance can be indicated on a scale with equally-spaced calibrations. Moreover, this meter can be adapted to function additionally as a torque motor, which is an essential element in the constructional arrangement of the discriminator of the invention.

It should be understood, of course, that the foregoing disclosure relates to a preferred embodiment of the invention and that it is intended to cover all changes and modifications of the examples of the invention herein chosen for the purposes of the disclosure, which do not constitute departures from the spirit and scope of the invention as set forth in the appended claims.

What is claimed is:

1. An automatic self-balancing remote measurement system of a process variable comprising: first converting means for converting a process variable into a variation of an electric reactance; second converting means for converting said variation of the electrical reactance into frequency variation of an electric signal; a frequency discriminating circuit which comprises first and second transformers, a tuning capacitor connected in series with the primary winding of the second transformer to construct a series tuning circuit, a voltage divider circuit, two rectifier elements, each of which is connected between the ends of the secondary winding of the first transformer and the ends of the voltage divider circuit, respectively, and means for supplying an output from the secondary winding of the second transformer between the center tap of the secondary winding of the first transformer and a connection point on said divider circuit; means for applying said electrical signal to the primary winding of the first transformer and the series tuning circuit; an amplifier to amplify the output signal of said frequency discriminating circuit taken across said voltage divider circuit; and self-balancing means responsive to the amplified output signal to cause the capacitance of the tuning capacitor to vary linearly in that direction which causes the output signal to decrease, whereby the output signal of the amplifier becomes substantially proportional to said electric reactance under balancing conditions.

2. The system as defined in claim 1, further comprising means for indicating the reactance value of the tuning capacitor corresponding to that of the process variable.

3. The system according to claim 1, wherein a variable air capacitor is used as the tuning capacitor and said self-balancing means is composed of a load resistance, a moving coil type torque-motor, the moving coil of which is connected between the load resistance and the output of the amplifier, and the shaft of the variable air capacitor being directly coupled to the shaft of a torque motor driven by the moving coil.

References Cited

UNITED STATES PATENTS

| | | | |
|---|---|---|---|
| 2,423,617 | 7/1947 | Rath | 324—99 XR |
| 2,542,372 | 2/1951 | Taylor et al. | 324—61 |
| 2,777,114 | 1/1957 | Lowe | 324—57 |
| 3,300,716 | 1/1967 | Engert | 324—61 |

FOREIGN PATENTS

| | | |
|---|---|---|
| 292,271 | 1/1932 | Italy. |
| 494,847 | 6/1945 | Italy. |

ARCHIE R. BORCHELT, *Primary Examiner.*

E. E. KUBASIWEICZ, *Assistant Examiner.*

U.S. Cl. X.R.

329—111; 324—87